(12) United States Patent
Farris

(10) Patent No.: US 7,705,975 B1
(45) Date of Patent: Apr. 27, 2010

(54) RETICLE

(76) Inventor: Michael Christopher Farris, 420 Century Way, # 100, Red Oak, TX (US) 75154

(*) Notice: Subject to any disclaimer, the term of this patent is extended or adjusted under 35 U.S.C. 154(b) by 239 days.

(21) Appl. No.: 11/504,516

(22) Filed: Aug. 14, 2006

Related U.S. Application Data

(60) Provisional application No. 60/595,918, filed on Aug. 16, 2005.

(51) Int. Cl.
*G01B 9/00* (2006.01)
(52) U.S. Cl. .................................................. 356/124
(58) Field of Classification Search ................ 356/124, 356/4.03, 71, 21; 42/122; 359/428
See application file for complete search history.

(56) References Cited

U.S. PATENT DOCUMENTS

| | | | |
|---|---|---|---|
| 1,190,121 A | 7/1916 | Crichett | |
| 2,806,287 A | 9/1957 | Sullivan | |
| 3,190,003 A | 6/1965 | O'Brien | |
| 3,392,450 A | 7/1968 | Herter et al. | |
| 3,431,652 A | 3/1969 | Leatherwood | |
| 3,492,733 A | 2/1970 | Leatherwood | |
| 3,682,552 A | 8/1972 | Hartman | |
| 3,948,587 A | 4/1976 | Rubbert | |
| 4,285,137 A | 8/1981 | Jennie | |
| 4,695,892 A * | 9/1987 | Mary | 348/176 |
| 4,912,853 A | 4/1990 | McDonnell | |
| 5,491,546 A | 2/1996 | Wascher et al. | |
| 5,920,995 A | 7/1999 | Sammut | |
| 6,032,374 A | 3/2000 | Sammut | |
| 6,163,368 A | 12/2000 | Hu | |
| 6,357,158 B1 | 3/2002 | Smith, III | |
| 6,453,595 B1 | 9/2002 | Sammut | |
| 6,516,551 B2 * | 2/2003 | Gaber | 42/132 |
| 6,591,537 B2 | 7/2003 | Smith | |
| 6,681,512 B2 | 1/2004 | Sammut | |
| 6,729,062 B2 | 5/2004 | Thomas et al. | |
| 7,185,455 B2 * | 3/2007 | Zaderey | 42/122 |
| 2002/0078618 A1 * | 6/2002 | Gaber | 42/123 |
| 2002/0124452 A1 | 9/2002 | Sammut | |
| 2002/0139030 A1 | 10/2002 | Smith | |
| 2004/0016168 A1 * | 1/2004 | Thomas et al. | 42/122 |
| 2005/0005495 A1 | 1/2005 | Smith | |
| 2005/0257414 A1 * | 11/2005 | Zaderey et al. | 42/122 |
| 2008/0098640 A1 * | 5/2008 | Sammut et al. | 42/122 |

OTHER PUBLICATIONS

Valdada Optics, Author Unknown, Jul. 18, 2006, http://www.valvada.com/vn/ior/reticle1?token=/url.token/.
Leupold, Author Unknown, Jul. 18, 2006, http://www.leupold.com/products/tactical_products/reticles_TMR.htm.
Schmidt/Bender, Author Unknown, Jul. 18, 2006, http://www.schmidtbender.com/reticlesPM.htm.
USOPITCS, Author unknown, Jul. 18, 2006, http://www.usopitcs.com/gallery/uploads/mil-scale-canadian.jpg, http://usopitcs.com/gallery/uploads/061.jpg.

* cited by examiner

*Primary Examiner*—Tarifur R Chowdhury
*Assistant Examiner*—Isiaka O Akanbi
(74) *Attorney, Agent, or Firm*—Eric Karich

(57) ABSTRACT

A reticle has a vertical line; a horizontal line intersecting the vertical line at a center point; and a plurality of quadrilaterals. Each of the plurality of quadrilaterals intersects either the vertical line or the horizontal line to form first and second measuring points. Each of the first and second measuring points is spaced a predetermined distance from the center point.

1 Claim, 6 Drawing Sheets

RETICLE

CROSS-REFERENCE TO RELATED APPLICATIONS

This application for a utility patent claims the benefit of U.S. Provisional Application No. 60/595,918, filed Aug. 16, 2005.

STATEMENT REGARDING FEDERALLY SPONSORED RESEARCH

Not Applicable

BACKGROUND OF THE INVENTION

1. Field of the Invention

This invention relates generally to telescopic and other optical sighting systems for use on guns or related items, and more particularly to an optical sighting system that includes an improved reticle for sniper rifles, hunting rifles, and the like.

2. Description of Related Art

A reticle is a grid or pattern placed in either of two focal planes of an optical instrument, such as a rifle scope, to establish scale or position. Various gun sights known in the art include reticles having an optical center, a vertical line, a horizontal line that intersects the vertical line at the optical center, and various forms of markings at predetermined distances along the vertical and horizontal lines for forming measuring points.

The mil-dot (or milliradian-dot) reticle uses precisely sized and shaped dots, sometimes separated by dashes midway between the dots, for enabling a user to quickly and effectively determine the approximate distance from the optic to a target, and to adjust his or her aim when aiming at distant targets. A mil-dot reticle enables a user to adjust the trajectory of a shot to compensate for bullet drop (caused by gravity), and for bullet drift (caused by wind).

One example of a mil-dot reticle is shown in Thomas et al., U.S. Pat. No. 6,729,062, which teaches a reticle that incorporates an optical center and a plurality of measuring points. The measuring points are formed by a primary vertical line, a primary horizontal line intersecting the primary vertical line at the optical center, a plurality of dots intersecting the primary lines and evenly spaced at a predetermined distance along the primary lines, a plurality of secondary lines intersecting one of the primary lines and evenly spaced between the dots therein. The secondary lines are shorter than 0.2 mil. Alternatively, the reticle further incorporates at least one post on at least one end of the primary lines with post hash marks thereon.

While the Thomas reference teaches a reticle with a plurality of dots, or hollow circles, that form measuring points, these circles can be difficult to use with great accuracy due to their curved shape. The Thomas reticle only includes two effective measuring points, the points at which the circle intersects the vertical line (or the horizontal line).

Another similar or related references includes Sammut, U.S. Pat. No. 6,681,512, which teaches a reticle having a ring which includes a plurality of crosshairs that enable a gun to be adjusted for various factors, including distance and wind.

Other similar or related references include U.S. application number 2005/0005495, U.S. Pat. No. 6,591,537, and U.S. application number 2002/0139030.

The above-described references are hereby incorporated by reference in full.

The prior art teaches various forms of reticle having a dots and/or hollow circles incorporated into the reticle. However, the prior art does not teach a reticle that includes a plurality of quadrilaterals for providing at least four measuring points. The four measuring points of the quadrilateral easier to use provide two measuring points that are vertically spaced a first distance, and two measuring points that are horizontally spaced a second distance. The first distance (vertical spacing) may or may not be the same as the second distance (the horizontal spacing), unlike a circle which is symmetrical and can have only one distance between the two aiming points. The present invention fulfills these needs and provides further related advantages as described in the following summary.

SUMMARY OF THE INVENTION

The present invention teaches certain benefits in construction and use which give rise to the objectives described below.

The present invention provides a reticle comprising a vertical line; a horizontal line intersecting the vertical line at a center point; and a plurality of quadrilaterals. Each of the plurality of quadrilaterals intersects either the vertical line or the horizontal line to form first and second measuring points. Each of the first and second measuring points is spaced a predetermined distance from the center point.

A primary objective of the present invention is to provide a reticle having advantages not taught by the prior art.

Another objective is to provide a reticle that includes a plurality of quadrilaterals disposed on a vertical line and a horizontal line for providing a plurality of measuring points.

Another objective is to provide a reticle that includes a plurality of quadrilaterals that each include at least four measuring points, each of the four measuring points being spaced a predetermined distance from the optical center of the reticle.

A further objective is to provide a reticle that includes a plurality of quadrilaterals that provide two measuring points that are vertically spaced a first distance, and two measuring points that are horizontally spaced, and wherein the vertical spacing and horizontal spacing may be the same or they may be different.

A further objective is to provide a reticle that enables accurate trajectory compensation both vertically and horizontally, for both bullet drop (vertical) and bullet drift (horizontal).

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

The above-described drawing figures illustrate the invention, a reticle 10 for rifle scopes, spotter's scopes, binoculars, or similar devices.

Figure 1:
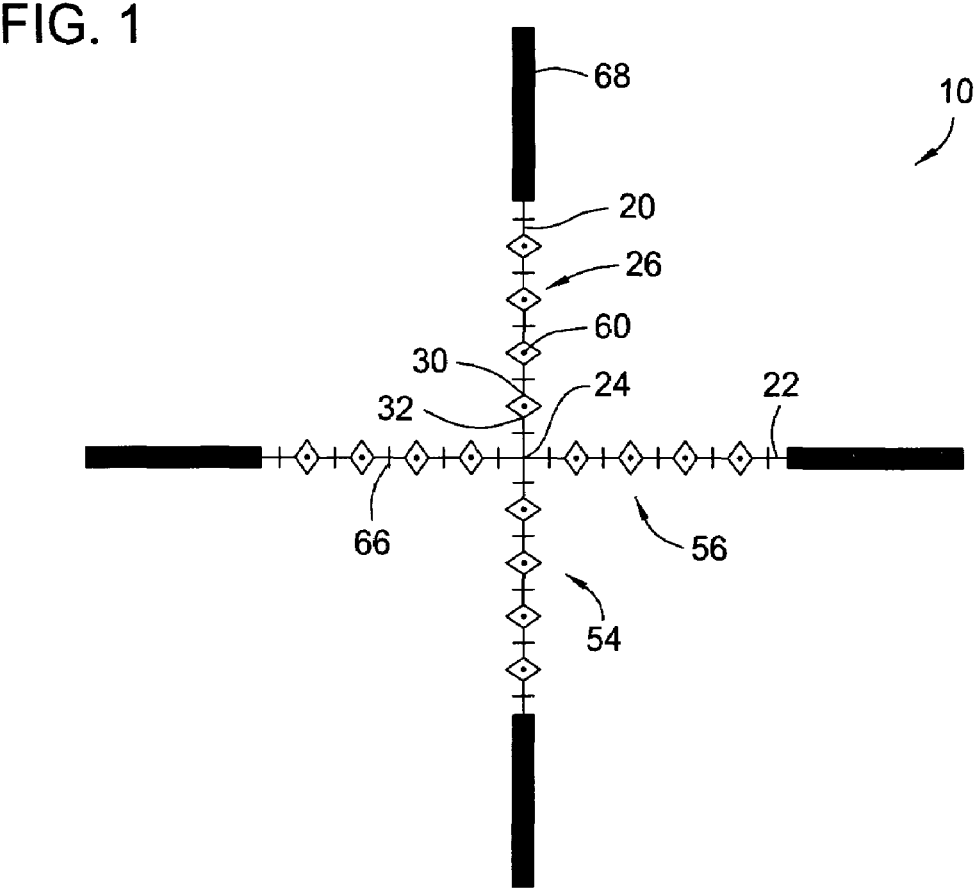
FIG. 1 is a top plan view of a reticle according to a first embodiment of the present invention.

FIG. 1 is a top plan view of the reticle 10 according to a first embodiment of the present invention. As shown in FIG. 1, the reticle 10 includes a vertical line 20, a horizontal line 22 intersecting the vertical line 20 at a center point 24, and a plurality of quadrilaterals 26. Each of the plurality of quadrilaterals 26 intersects either the vertical line 20 or the horizontal line 22 at two points to form first and second measuring points 30 and 32. Each of the first and second measuring points 30 and 32 is spaced a predetermined distance from the center point 24.

Figure 2A:
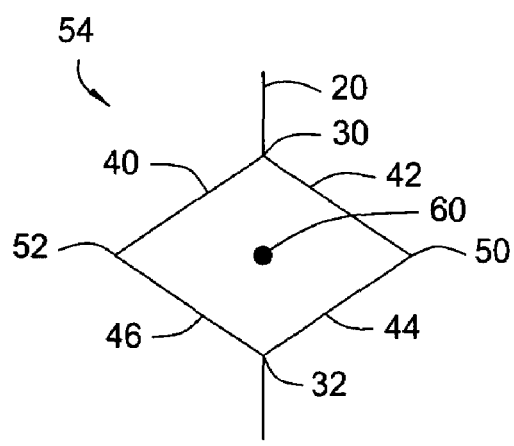
FIG. 2A is a top plan view of one of a plurality of quadrilaterals disposed on the vertical line from the reticle of FIG. 1.
Figure 2B:
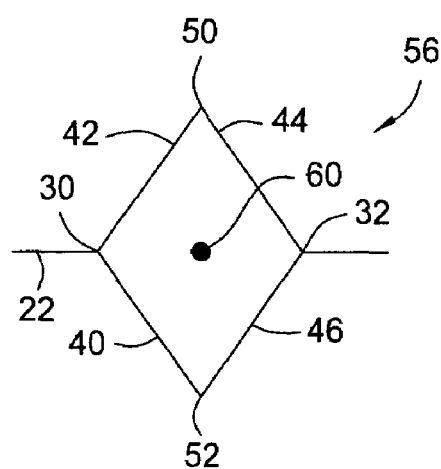
FIG. 2B is a top plan view of one of a plurality of quadrilaterals disposed on the horizontal line from the reticle of FIG. 1.

As shown in FIGS. 1, 2A, and 2B, each of the plurality of quadrilaterals 26 includes a first side 40, a second side 42, a third side 44, and a fourth side 46. The first and second sides 40 and 42 intersect to form the first measuring point 30; the third and fourth sides 44 and 46 intersect to form the second measuring point 32; the first and fourth sides 40 and 46 intersect to form a third measuring point 52; and the second and third sides 42 and 44 intersect to form a fourth measuring point 50.

The first side 40 may be a first line, the second side 42 may be a second line, the third side 44 may be a third line, and the fourth side 46 may be a third line.

FIG. 2A is a top plan view of one of a plurality of quadrilaterals 26 disposed on the vertical line 20 from the reticle 10 of FIG. 1. As shown in FIG. 2A, in the vertically spaced quadrilaterals 54, those quadrilaterals 26 that intersect the vertical line 20, the first and second measuring points 30 and 32 are disposed on the vertical line 20, and the third and fourth measuring points 50 and 52 are horizontally spaced from the vertical line 20 a predetermined distance.

FIG. 2B is a top plan view of one of a plurality of quadrilaterals 26 disposed on the horizontal line 22 from the reticle 10 of FIG. 1. As shown in FIG. 2B, in the horizontally spaced quadrilaterals, those quadrilaterals 26 that intersect the horizontal line 22, the first and second measuring points 30 and 32 are disposed on the horizontal line 22 and the third and fourth measuring points 50 and 52 are vertically spaced from the horizontal line 22 a predetermined distance.

With regards to one of the quadrilaterals 26 on the horizontal line 22, the first and second measuring points 30 and 32 enable horizontal trajectory compensation, for wind drift. The third and fourth measuring points 50 and 52 enable vertical trajectory compensation/wind drift, for bullet drop caused by gravity combined with wind.

As shown in FIGS. 1, 2A, and 2B, each of the plurality of quadrilaterals 26 preferably further includes a middle point 60 located within each of the plurality of quadrilaterals 26 and on either the vertical line 20 or the horizontal line 22, the middle point 60 being spaced a predetermined distance from the center point 24 to form a fifth measuring point.

Figure 3:
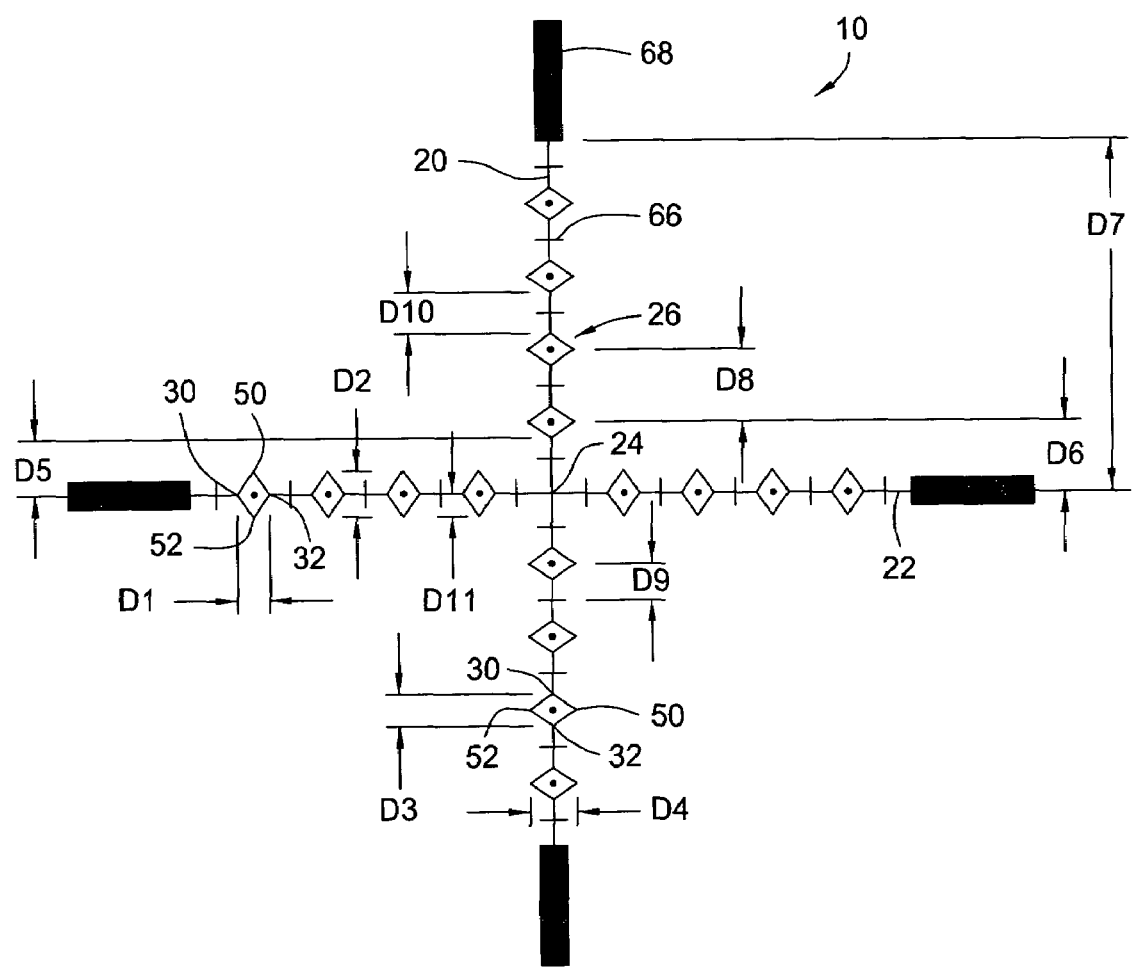
FIG. 3 is a top plan view of the reticle of FIG. 1, illustrating the predetermined distances between the various measuring points of the reticle.

FIG. 3 is a top plan view of the reticle 10 of FIG. 1, illustrating the predetermined distances between some of the various measuring points of the reticle 10. As shown in FIG. 3, in the first embodiment, the first and second measuring points 30 and 32 of the horizontal quadrilaterals are separated by a first distance D1, which in this embodiment is 0.20 MIL. The third and fourth measuring points 50 and 52 of the horizontal quadrilaterals are separated by a second distance D2, which in this embodiment is 0.25 MIL.

In this embodiment, the first and second measuring points 30 and 32 of the vertically spaced quadrilaterals 54 are separated by a third distance D3, which in this embodiment is 0.20 MIL. The third and fourth measuring points 50 and 52 of the vertically spaced quadrilaterals 54 are separated by a fourth distance D4, which in this embodiment is 0.25 MIL. The second measuring point 32 of the closest of the plurality of quadrilaterals 26 to the center point 24 is spaced a fifth distance D5 from the center point 24, and the middle point 60 of that quadrilateral 26 is spaced a sixth distance D6 from the center point 24. The fifth distance D5 is preferably 0.90 MIL in this embodiment, and the sixth distance D6 is preferably 1.00 MIL in this embodiment.

The overall distance from the center point 24 to a post 68 of the reticle 10 is a seventh distance D7, which in this embodiment is 5.00 MILs. The middle points 60 of two adjacent quadrilaterals 26 are separated by an eighth distance D8, which is preferably 1.00 MIL. The middle point 60 separated from the adjacent hash mark by a ninth distance D9, which in this embodiment is 0.50 MIL. The second measuring point 32 is separated from the adjacent first measuring point 30 by a tenth distance D10, which in this embodiment is 0.8 MIL. The third and fourth measuring points are laterally spaced a predetermined distance D11 from either the vertical line 20 or the horizontal line 22, and in the present embodiment this is 0.125 MIL (or ½ A of the second distance D2).

Figure 4A:
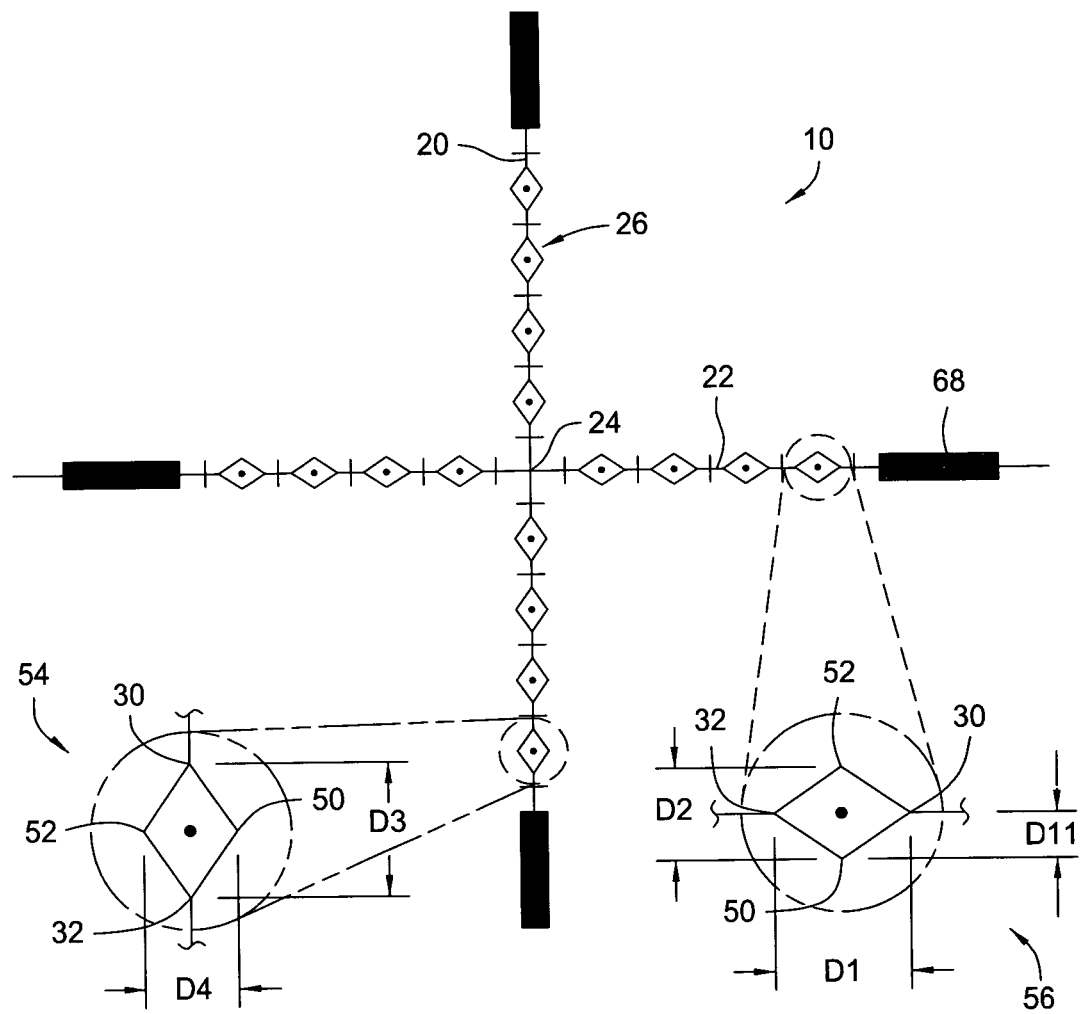
FIG. 4A is a top plan view of a second embodiment of the reticle of FIG. 1.

Of course, the measurements described in FIG. 3 may vary according to the specific requirements of the user. FIG. 4A is a top plan view of a second embodiment of the reticle 10 of FIG. 1. As shown in FIG. 4A, the first distance D1 may be 0.25 MIL, while the second distance D2 is 0.20 MIL; and the third distance D3 may be 0.25 MIL, while the fourth distance D4 is 0.20 MIL. Other embodiments having alternative measurements are also considered possible, and should be considered within the scope of the claimed invention. Alternative examples include, but are not limited to, the following: 0.20× 0.25, 0.25×0.20, 0.20×0.20, 0.25×0.25, 0.50×0.50, or any other measurement that a user might find useful.

Figure 4B:
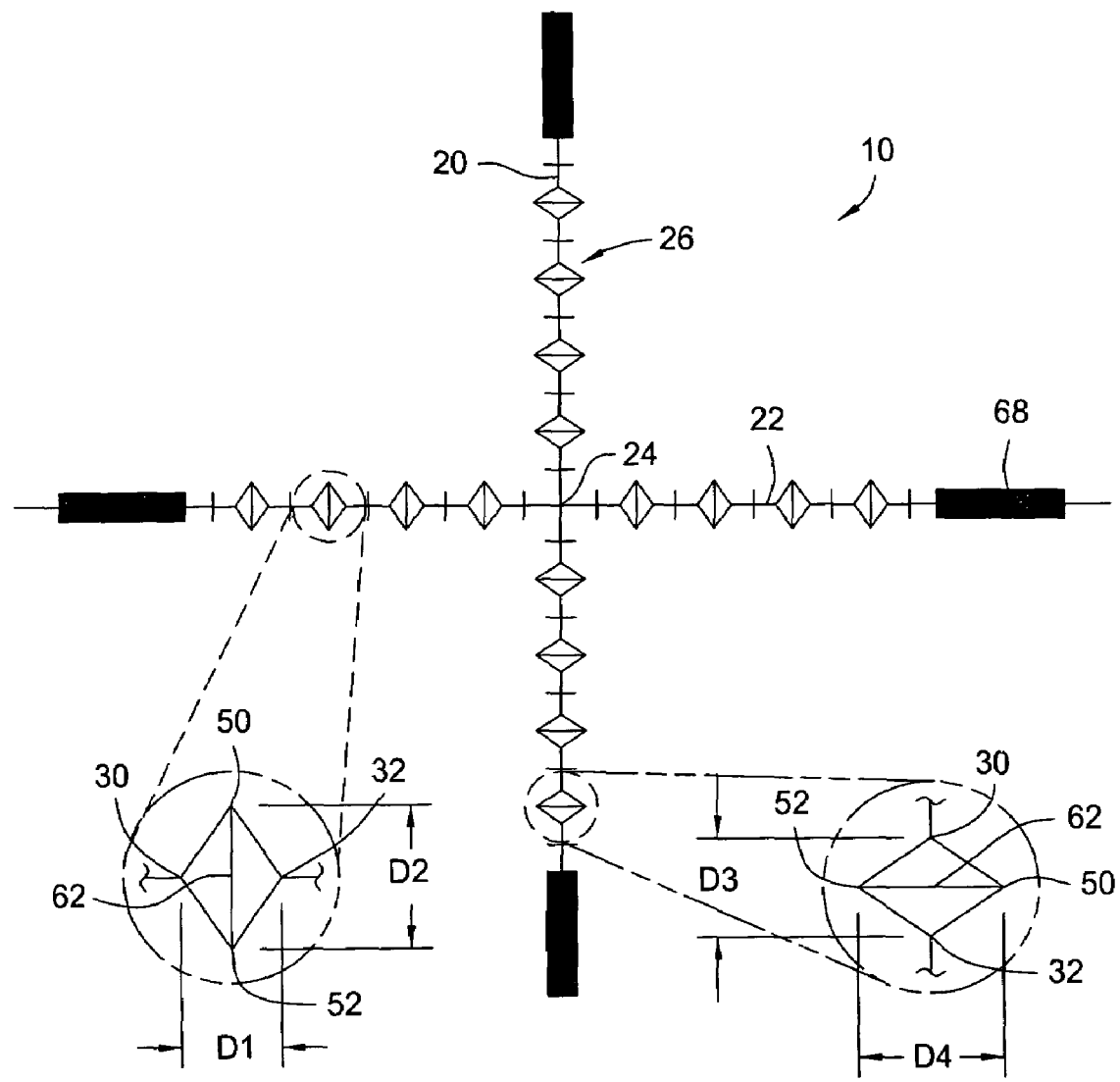
FIG. 4B is a top plan view of a third embodiment thereof.

FIG. 4B is a top plan view of a third embodiment of the reticle 10 of FIG. 1. As shown in FIG. 4B, in this embodiment, the first distance D1 may be 0.25 MIL, while the second distance D2 is 0.20 MIL; and the third distance D3 may be 0.25 MIL, while the fourth distance D4 is 0.20 MIL. Obviously, those skilled in the art may device any arrangement of distances that may be useful to a user, and such alternative and/or equivalent arrangements should be considered within the scope of the claimed invention.

Figure 5:
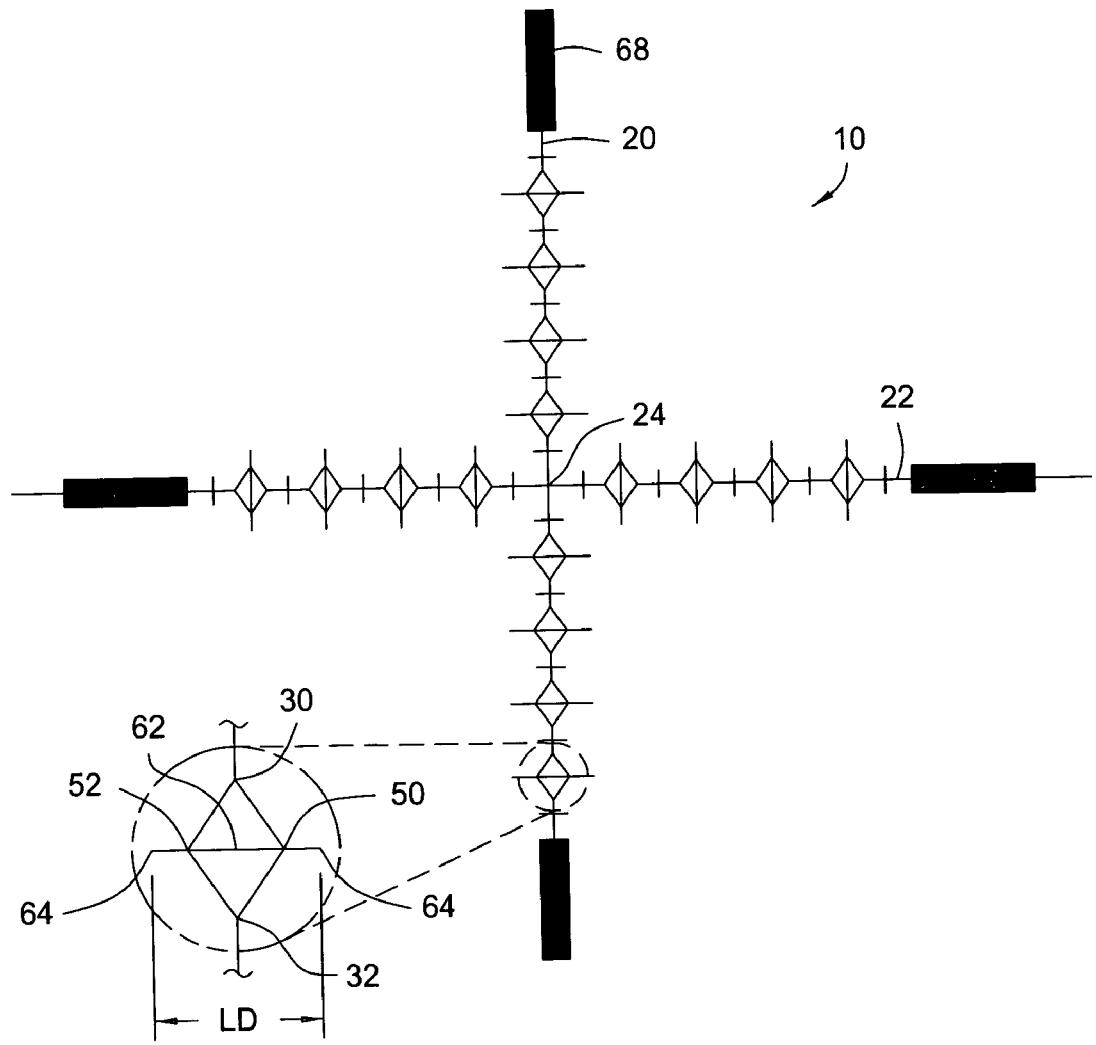
FIG. 5 is a top plan view of a fourth embodiment thereof.
Figure 6:
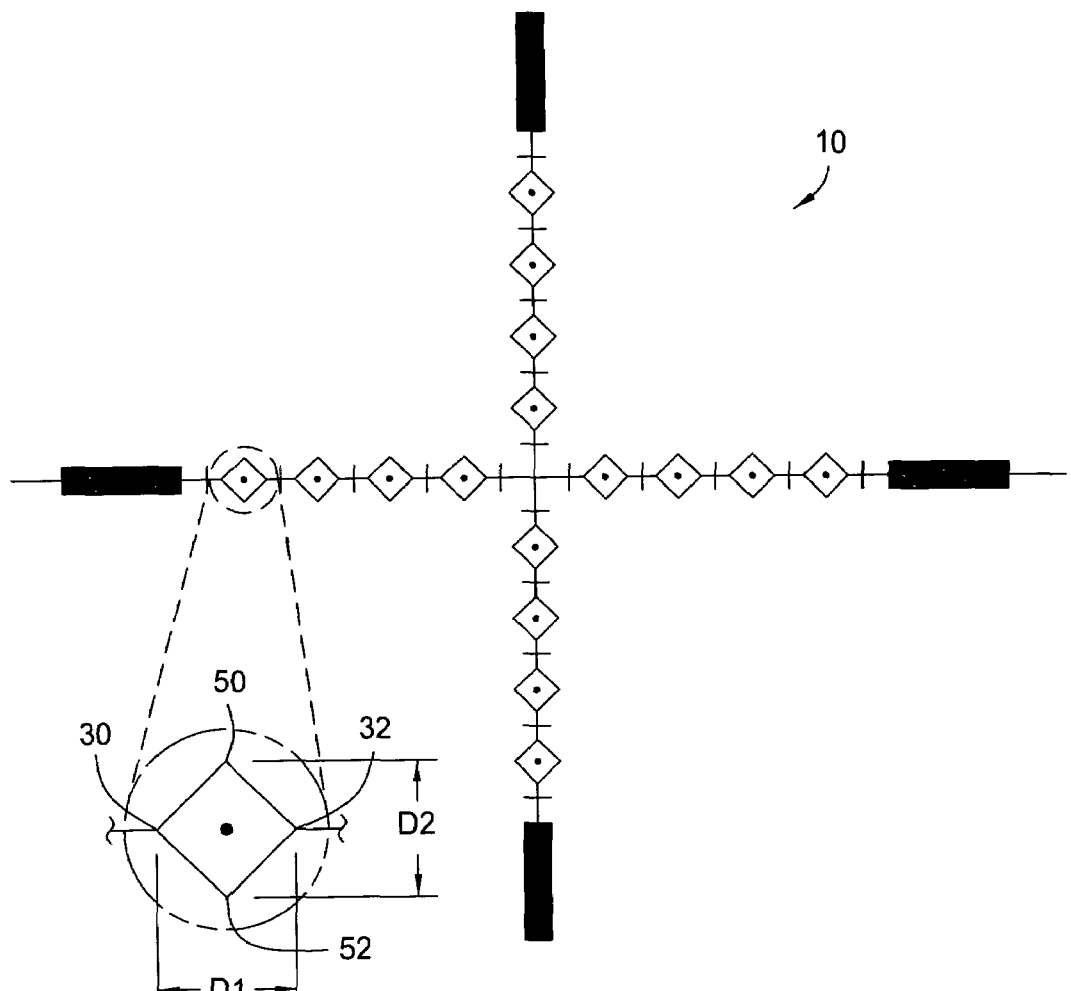
FIG. 6 is a top plan view of a fifth embodiment thereof.

In the embodiments of FIGS. 4B and 5, each of the plurality of quadrilaterals 26 may further include a line 62 that connects the third and fourth measuring points 50 and 52. This line 62 may extend across the quadrilateral 26, as shown in FIG. 4B, or the line 62 may extend beyond the quadrilateral 26, as shown in FIG. 5. In the embodiment of FIG. 5, the line 62 extends a distance LD to extended points 64. These lines 62, and/or the extended points 64, provide additional points of reference for estimating distance to target, or for adjusting for wind or other factors.

For purposes of this application, the vertical and horizontal lines 20 and 22 may be solid lines, or they may be partially broken for purposes of clarity, as long as enough of the lines are clearly represented for operative use. As shown in the above-described figures, the vertical and horizontal lines 20 and 22 are not shown within the quadrilaterals 26 for purposes of clarity.

As shown in the various Figures, the reticle 10 preferably further includes a plurality of median hash marks 66 that are each disposed between two of the plurality of quadrilaterals 26 (or between one of the plurality of quadrilaterals 26 and the center point 24 of the reticle 10). The plurality of median hash marks 66 are each disposed a predetermined distance from the center point 24 of the reticle 10, typically one-half of the distance D6 or increments thereof.

Figure 7A:
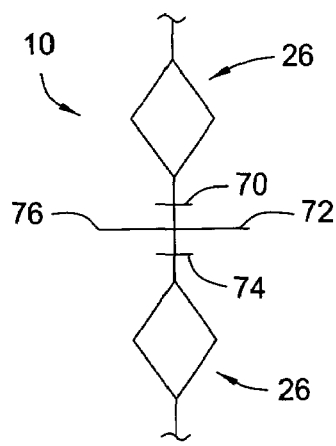
FIG. 7A is a top plan view of two of the plurality of quadrilaterals separated by three secondary marks.
Figure 7B:
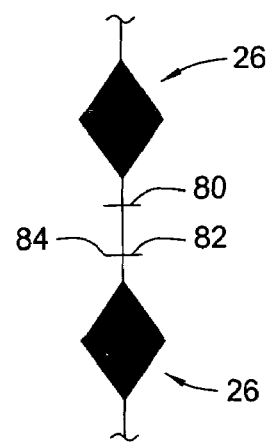
FIG. 7B is a top plan view of two of the plurality of quadrilaterals separated by two secondary marks.

While FIGS. 1-6 illustrate a reticle 10 that includes a single median hash mark 66 between each of the plurality of quadrilaterals 26, the reticle 10 may also include alternative embodiments of the median hash marks 66, or no hash marks. FIG. 7A is a top plan view of an alternative embodiment of the reticle 10, wherein the plurality of quadrilaterals 26 are separated by three secondary marks 70, 72, and 74. FIG. 7B illustrates another embodiment wherein the plurality of quadrilaterals 26 are each separated by two secondary marks 80 and 82. The secondary marks 70, 72, 74, 80, and 82 may be of any spacing, and are preferably evenly spaced to provide useful measuring points. The secondary marks are also of predetermined length, so as to provide alternative measuring points at their ends 76. In FIG. 7A, two of the secondary marks 70 and 74 are one-half the length of the width of the quadrilateral 26, while the third secondary mark 72 is twice the width. In FIG. 7B, the two secondary marks 80 and 82 are both the same length as the width of the quadrilaterals 26. Obviously, those skilled in the art may determine other spacing arrangements that may be useful to a user of the reticle 10, and all of such alternative arrangements and embodiments should be considered within the scope of the present invention.

As shown in FIG. 7B, the quadrilaterals 26 may also be solid. While the solid embodiment might obscure a user's view somewhat, it is also less cluttered, and quicker to use, and this alternative embodiment should be considered within the scope of the present invention.

While we specifically discuss milradian measurements, the terms of the present invention are hereby defined to also include alternative measurement systems, including minute of angle (MOA) systems, measurements in inches, and any other measurement systems that may be useful and desired by a user.

Certain terminology is used in the preceding description for convenience only, and is not limiting. Words such as "vertical," "horizontal," and the like, designate directions in the drawings to which reference is made. The terminology includes the words described above, similar or equivalent words, and derivatives thereof. Additionally, the words "a," "an," and "one" are defined to include one or more of the referenced item unless specifically stated otherwise. Also, the terms "have," "include," "contain," and similar terms are defined to mean "comprising" unless specifically stated otherwise.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A reticle comprising:

a vertical line;

a horizontal line intersecting the vertical line at a center point;

a plurality of diamonds spaced along the vertical and horizontal lines, each of the plurality of diamonds intersecting either the vertical line or the horizontal line to form first and second measuring points, each of the first and second measuring points being spaced a predetermined distance to one side of the center point;

wherein each of the plurality of diamonds includes a first line, a second line, a third line, and a fourth line, wherein the first and second lines intersect to form the first measuring point, wherein the third and fourth lines intersect to form the second measuring point, wherein the first and fourth lines intersect to form a third measuring point, wherein the second and third lines intersect to form a fourth measuring point, wherein the first and second measuring points are located on either the vertical line or the horizontal line;

wherein the third and fourth measuring points are laterally spaced a predetermined distance from either the vertical line or the horizontal line; and wherein none of the plurality of diamonds surround the center point at the intersection of the vertical and horizontal lines, but are all spaced either vertically or horizontally from the center point.

\* \* \* \* \*